Nov. 24, 1964    F. W. FARNAM ETAL    3,158,526
REINFORCED GASKET PRODUCTS
Filed Nov. 20, 1961    3 Sheets-Sheet 2
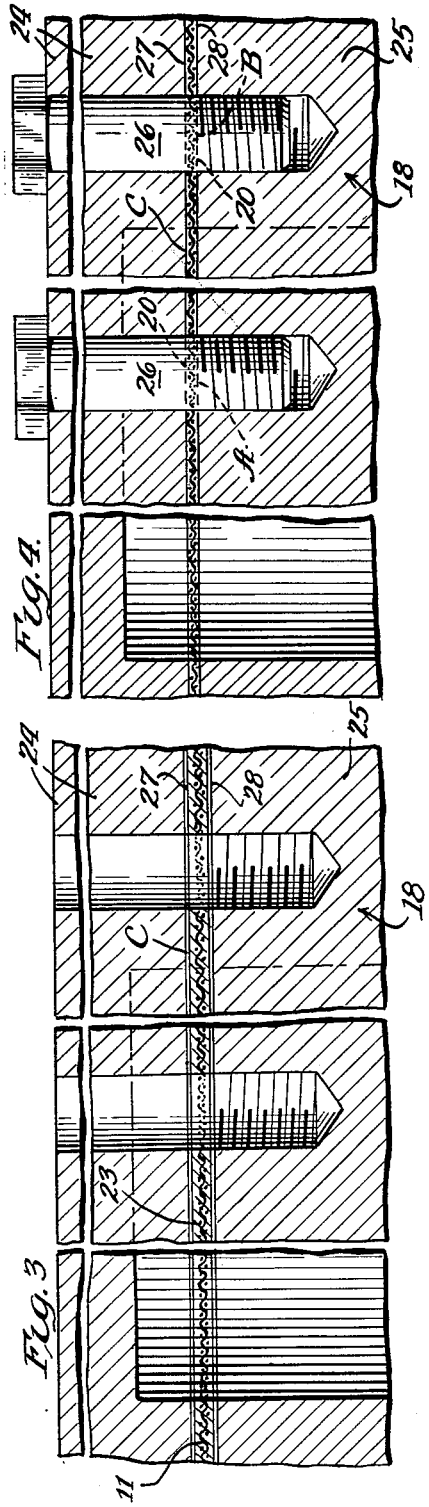
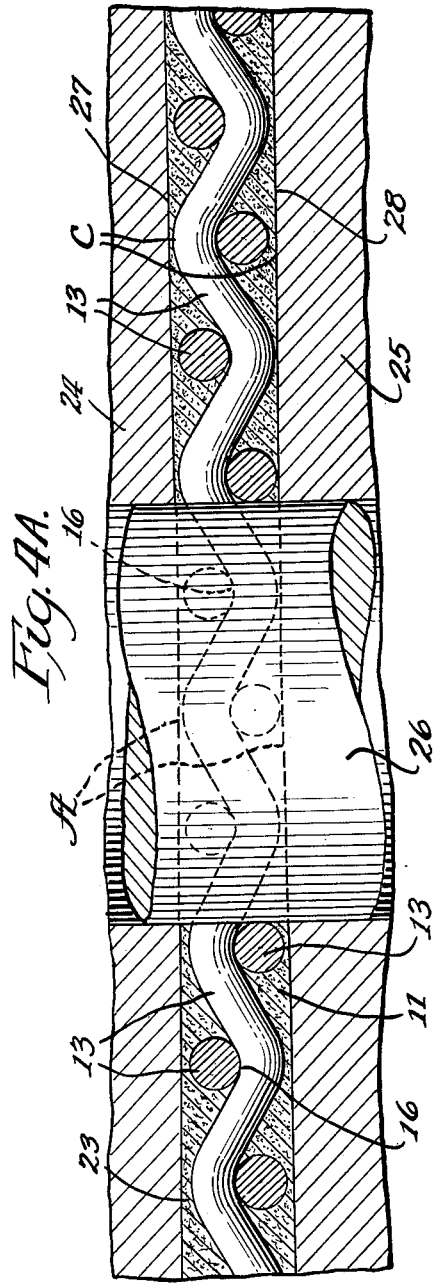
Inventors
Franklin W. Farnam
Robert G. Farnam
By Mann, Brown & McWilliams
Attys.

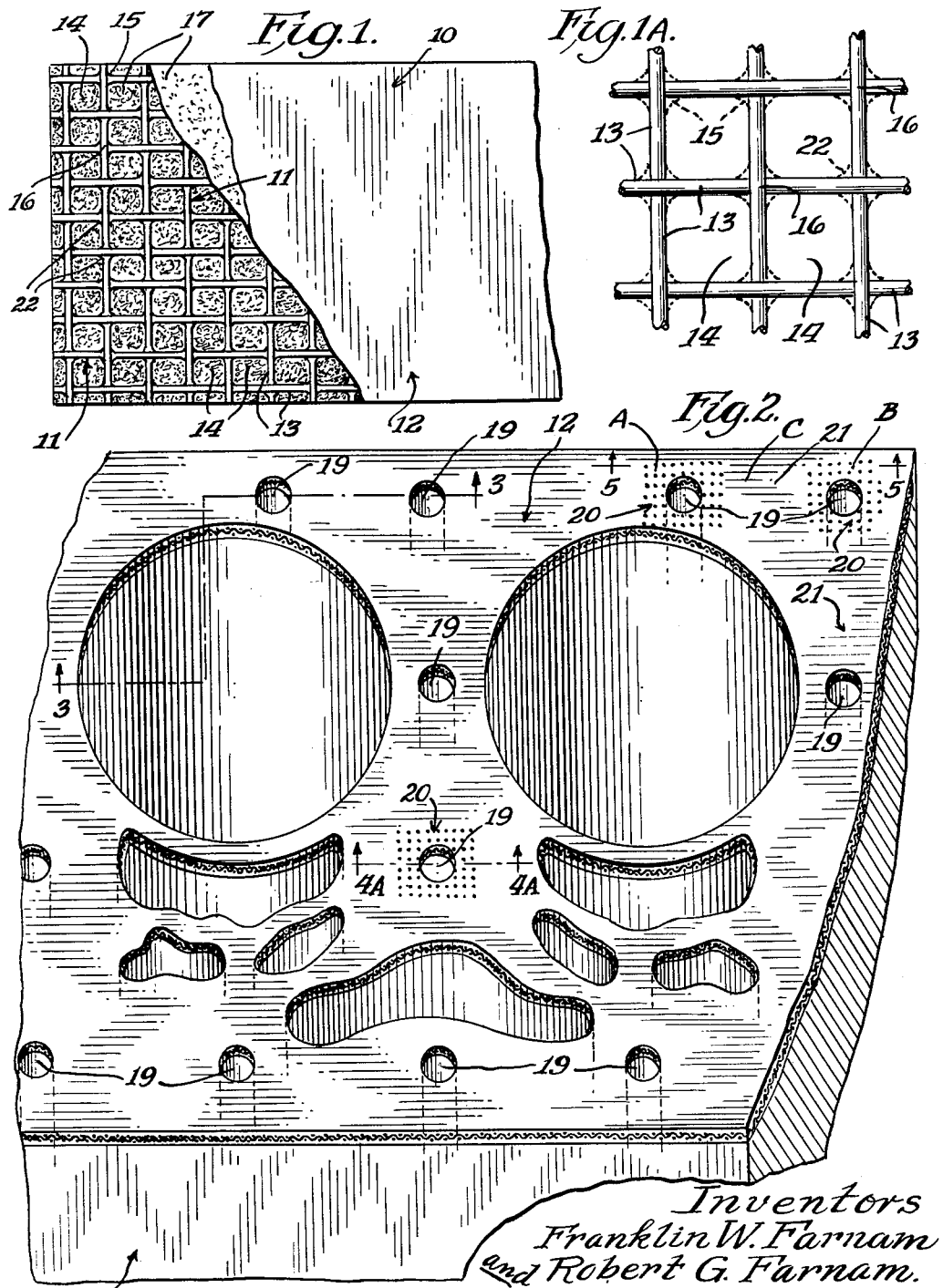

Nov. 24, 1964
F. W. FARNAM ETAL
3,158,526
REINFORCED GASKET PRODUCTS
Filed Nov. 20, 1961
3 Sheets-Sheet 3
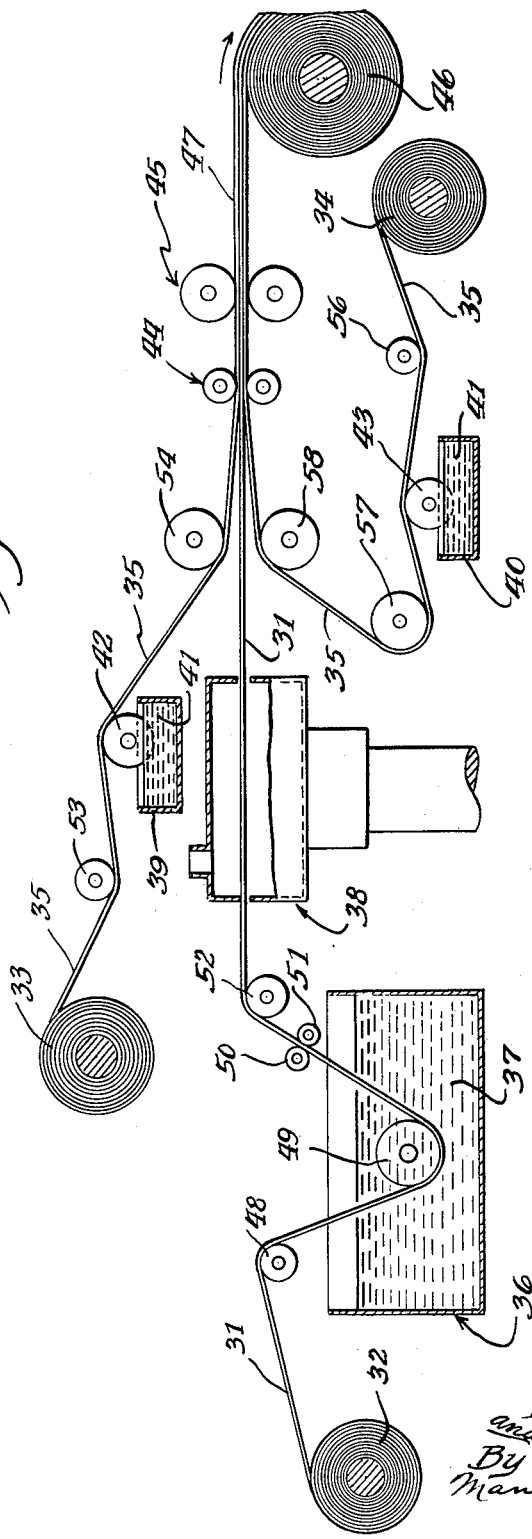
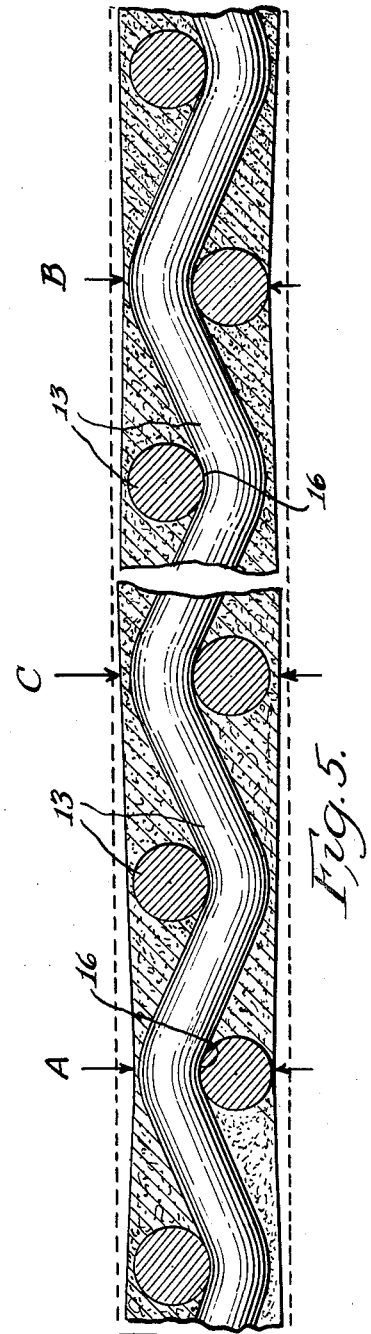
Inventors.
Franklin W. Farnam
and Robert G. Farnam
By
Mann, Brown & McWilliams,
Attys.

3,158,526
REINFORCED GASKET PRODUCTS
Franklin W. Farnam, Wheaton, and Robert G. Farnam, Glen Ellyn, Ill., assignors to F. D. Farnam Co., a corporation of Illinois
Filed Nov. 20, 1961, Ser. No. 153,548
4 Claims. (Cl. 161—95)

This invention relates to improvements in metal-reinforced composition gaskets and has particular application to gaskets of the type used in internal combustion engines, compressors, and the like, and especially in engines of the type known as high compression motors.

More particularly, the invention is directed to metal-reinforced sheet packing in which the metal reinforcing component serves as an essentially non-compressible force or stress-bearing component and the associated packing material serves as a relatively compressible and resilient sealing element.

Also included within the scope of this invention are methods for constructing the special products of the invention.

In accordance with the practice of this invention essentially all of the important features and functional sealing characteristics of the ideal gasket are realized. The gaskets of the preferred embodiments of the invention compress and conform in use to seal at the surfaces of the confining flanges. The confining members essentially bottom on the non-compressible metallic core element to obviate stress relaxation and to minimize loss of applied torque pressures.

The gaskets of this invention are uniquely adapted for service as seals between metal surfaces and, for example, they may be used as cylinder head gaskets, exhaust manifold gaskets, compressor head gaskets, etc., where the torque loading and/or the temperature are relatively high. The gaskets are also useful for lower torque sealing applications such as carburetor installations, and as seals against various solvents, gases, water, and other agents.

It is well known that when a non-metallic gasket is subjected to the combination of elevated temperature and excessive compression force, the gasket tends to "relax." That is, it fails to maintain a stressing resilient seal between the confining members. This relaxation results in a drop in the compression forces at the flanges so that a leakage path occurs over the surface of the gasket or through it.

An additional problem present (but sometimes overlooked) in gasket engineering is that the degree to which the particular packing of a given gasket is compressed should be carefully controlled. If there is too little compression, the gasket does not provide an adequate seal between the confining surfaces, and the packing itself may lack the density required to render it impervious to the fluids and to gases with which it comes into contact in use. On the other hand, if the packing is compressed to too great a degree, it loses its resiliency and tends to set, thereby failing to satisfy the requirements of gasket sealing. Packing compressed to too great an extent can readily be crushed, thus losing its structural strength and failing in use.

Still another important requirement of gaskets is that there be no loss of flange pressure or applied torque after the mechanical apparatus has once been assembled. Such loss of flange pressure ordinarily occurs during the normal operation cycles as a result of the stresses and forces applied to the gasket during its use. During exposure to mechanical stresses and broad temperature variations, the elevated flange forces act upon the packing to compress the packing, often beyond its elastic limits. Then, when the operation cycle is completed and the equipment returns to ambient temperature, the packing often fails to recover sufficiently to seal. Repeated cycles tend further to cause fatigue and setting of the gasket and, ultimately, the gasket seal fails and gasket replacement is necessary.

Many approaches to the solution of these and other related problems have been investigated, but, until the present invention, no completely satisfactory answer has been found.

Many prior art gaskets have been devised and tested with the purpose of developing a product which might successfully withstand the high temperatures, the stresses, strains, and pressures encountered in internal combustion engine applications. However, none of the prior art products has successfully met the challenge. Some of the gaskets which have been used are discussed briefly in the following paragraphs.

In one specific type of prior art gasket the compressible packing material of the gasket has been enveloped in a metallic envelope or sheath. In this construction, an inner layer of relatively soft compressible material and of appreciable thickness is disposed between layers of extremely thin sheet metal. The metal envelope contacts and bears against the surfaces of the head and block or other mechanical assemblage in which the gasket is installed. In gaskets of this type, should the thin metal sheets become ruptured or punctured, or otherwise broken, the pressure within the mechanical assemblage would be released through the interstices of the fragile and compressible material. Another significant disadvantage of this type of gasket is that, when subjected to the high flange pressures associated with many installations, the seal, though possibly satisfactory when first formed, is subject to gradual loss of "torque" or flange pressure. The resilience of the compressible packing, relied upon to maintain the seal, fails to satisfy the demands imposed by broad temperature fluctuations, and by compression shock, etc. The composite assembly is subject to relaxation phenomena and the gasket fails to maintain an adequate seal. The packing is not protected against the application of excessive compressive forces which tend, in use, to stress the packing beyond its elastic limits.

Still another disadvantage of the metal-clad gasket is that the metal sheath, even when of extremely thin sheet, is not an ideal medium for insuring precise conformance to and intimate sealing contact with the clamping surfaces of the unit in which the gasket is installed. Even minor irregularities in the surfaces become nuclei of potential leakage and failure.

Other types of prior art gaskets which have been used as seals in mechanical assemblies are all-metal gaskets. These gaskets have no appreciable resilience and are thus unsuitable for many applications. Subject to brittleness, and to permanent set at high compression force, they tend to permit leakage because of failure to "follow" and "stress" the confining surfaces. Moreover, the limited conformability of the metal to any irregularities in the surfaces of the assemblies to be sealed is another significant deficiency. In order to compensate for lack of resiliency in this type of gasket, metal beads have been used to improve the sealing characteristics. But such gaskets, when clamped between engine parts, seal only at the beads; the seal at the facing surfaces is poor and is inadequate for many purposes. All-metal gaskets with embossed portions or with coatings near openings exhibit similar undesirable features. Corrugated metal gaskets are subject to set and are objectionable, in particular applications, for this and other reasons.

Spirally wound metal-reinforced gaskets with packing and with and without cooperating pressure rings have found acceptance for special applications but do not have general use and are relatively costly to produce.

Other prior art gaskets are laminated products of metal and packing material. In some of these the metal reinforcing layer takes the form of a metal screen or a perforated or foraminous metal sheet. In these gaskets the metal member serves to impart mechanical strength to the sheet material to facilitate handling and manipulation, and to afford improved dimensional stability and lateral rigidity. The metallic element is ordinarily embedded well within the packing material (which is frequently rubber or rubber-like material) and both the sealing and the stress support are supplied essentially by the packing composition. In the metal-core-reinforced sheet described above, the metallic element is not intended to and does not support the flange forces impressed in use and, again, the packing material, which is relied upon to resist the applied pressures, is often subjected to stresses which exceed its elastic limits or which impair adequate recovery.

In still other prior art metal-reinforced gaskets the metallic elements comprise sheets from which tangs have been struck, or which have otherwise been fabricated or stamped to provide protuberances, pockets, or prongs. The tangs or prongs are described as serving to anchor the packing composition in place, to provide a degree of resiliency in the final gasket products, and to act as cushioning means to limit the compressibility of the gasket as a whole. In some of these metal-reinforced sheets the struck or otherwise deformed metal is contained entirely within and is covered by the packing material; in other arrangements the projections extend through the layers of gasket material and are clinched over to lie in the plane of the sheet.

One objectionable feature of the metal-reinforced gaskets described above is that such gaskets have often been of non-uniform thickness. In some cases this lack of uniformity is caused by the metal protuberances of the internal metallic element holding the laminated gasket together. Such protuberances have often been the focal points of leaks believed to be due to incomplete sealing in the immediate region of the metal protuberances of tangs. Various procedures have been devised with the aim of avoiding the undesirable effects of the special structural features of these gaskets. Particularly, cements and fillers have been applied between the mehcanical members of the final assemblage. But the cements themselves are often adversely affected by heat, oil, solvents, or water, etc., and thus any advantage they might supply is short-lived. Although, when initially installed in a given mechanical assemblage, gaskets having internal metallic reinforcing members with extruding or projecting prongs or tangs may exhibit resiliency somewhat superior to the metal-sheet-clad gasket and superior to solid metal gaskets, this resiliency is rapidly lost as the metal protuberances crystallize, bend or deform, set or become subject to mechanical fatigue. When this occurs the tangs act to prevent an adequate seal between the packing and the confining surfaces or, alternatively, fail to protect the packing from the application of compressive forces which may exceed the elastic limits of the particular packing composition.

The novel sheet gasket products of the present invention avoid many of the objectionable features of prior art constructions and solve complex problems which have long plagued the gasket industry, and which have long defied solution.

The improved gaskets made in accordance with the teachings of this invention have been found to withstand extraordinary stresses in use. They are exceptionally shock and vibration resistant and will sustain the continuous and extended pulsing and the elevated flange pressures and/or temperatures associated with many uses such as internal combustion engine head gaskets and manifolds, and in compressor heads and pumps, etc. without loss of flange pressure or applied torque. The packing material is effectively protected from excessive and uncontrolled mechanical stress and retains its elastic properties.

The present invention is furthermore directed to a gasket in which the exposed sealing surfaces are flat and lie in substantially parallel planes and in which a finite but carefully controlled thickness of compressible packing material overlies a compression-resistant metal core. In accordance with the practice of this invention good high compression seals can be obtained using thin sheet gasket material, as well as with thicker sheet products, if desired.

An important feature of the sheet gasket of this invention is that it includes a force-bearing element which is essentially non-compressible and extends through at least the major portion of the thickness of the sheet material. In a preferred embodiment of the invention, the force-bearing element comprises piers, columns, or pillars, or a lattice of metallic material coextensive with the gasket. This metallic core is mechanically much stronger than the packing, fibrous composition, or other relatively compressible material with which it is associated, and, in use, the elements of the lattice which extend transversely in the sheet support the stresses imposed by the applied flange pressures. The metallic supports or spacers resist not only bending and distortion but also compression and this protects the packing of the gasket from excessive compressive forces and insures retention of flange pressures.

Among the objects of this invention are: to provide a gasket comprising a packing material reinforced with a compressive stress-supporting core of woven wire within the packing material, and bonded thereto; to provide a gasket sheet resistant to uncontrolled flow and creep, and including a metal core having non-distortable and essentially non-compressible spaced metal pillars or piers extending substantially through the thickness of the sheet, and, in gasket use, substantially flush with the outer faces of the sheet. In a preferred embodiment of the invention the piers are interconnected in the form of a lattice in the mass of the material constituting the body of the sheet. Still another object of the invention is to provide a gasket in which the packing material can flow relatively freely through the meshes and by and around the wires to conform to surface irregularities without fracture of the packing during flow.

Additional objects are: to provide a composite sheet gasket material extremely durable and stable under the high pressure developed in machines, etc. with which gaskets are associated as, for example, in internal combustion motors, as well as in compressors and fluid lines; to provide a metal-core reinforced gasket resistant to the action of heat, oil, gases and water, as well as to other chemicals and to physical stresses such as the wide variations in temperature and pressure ordinarily encountered in the applications to which gaskets are directed, and in which they find utility; to provide a sheet gasket containing new and improved elastomeric compounds of exceptional chemical resistance and high temperature stability;

to provide a sheet gasket product containing an internal woven wire screen wherein the knuckles of the screen have been locked by means of a metallic, plastic, or resinous locking agent applied thereto; to provide a composite gasket sheet including a metal core and enveloping packing material and in which the bond between the core and the packing is improved by use of a special adhesive or bonding agent; to provide a gasket product comprising two packing sheets sandwiching an internal metal core having openings therethrough and in which product an adhesive is used to bond the sheets to each other through the openings in the metal core; to provide a gasket product in which the packing material fills and is compacted within the meshes of a woven wire screen and overlies the surface of the screens; to provide a sheet gasket product composed of packing and an internal reinforcing and force-bearing metal core wherein the core comprises expanded metal sheet; to provide a gasket having improved mechanical reinforcement and better heat dissipation.

In accordance with the practice of this invention the sheet gasket material is fabricated so that, upon the application of compression forces, the sealing members or flanges bottom, or effectively bottom, on the knuckles or piers of the metal core of the gasket. In this manner, substantially flange-to-flange metal contact is realized. The resulting structure is not susceptible to the detrimental effects of stress relaxation or torque loss. In the gasket of this invention the packing material provides the seal while the knuckles or pillars of the metal core provide the essentially non-compressible support for the impressed load. The gasket may be made of any desired thickness. Important savings in material may be realized since thin gaskets made in accordance with the practice of this invention have all the important advantages of thicker gaskets.

Other important aims of the invention are to provide a method of fabrication of sheet packing wherein simplicity, efficiency, and economy are achieved, and to realize further objects, advantages and capabilities inherent in the invention or as will become evident in the light of the specification and the claims.

In the accompanying drawings forming a part of this specification and in which like numerals are employed to designate like parts throughout the same;

FIG. 1 is a face view, with parts cut away, of a sheet gasket product embodying the invention;

FIG. 1A is an enlarged view of the woven wire core of the gasket;

FIG. 2 is a schematic representation, with parts cut away, of the sheet gasket product of the invention in position on the block of an engine;

FIG. 3 is a vertical sectional view of the gasket of the invention in position between the head and the block of an engine, and prior to tightening of the bolts fastening the head to the block;

FIG. 4 is a view similar to that of FIG. 3, but showing a cross-section of the gasket of the invention as it appears following the tightening down of the head upon the block;

FIG. 4A is an enlarged vertical sectional view of the compressed gasket in the region of a bolt;

FIG. 5 is an enlarged sectional view of the edge of the sheet gasket product of the invention showing the configuration of the sheet product before (dotted line) and after compression sealing forces are applied;

FIG. 6 is a schematic or diagrammatic representation illustrating a preferred method of fabricating the product of the invention.

GENERAL ORGANIZATION

In a preferred embodiment of the invention, the improved gasket, which is generally designated 10 (FIG. 1) comprises a core of woven wire or plastic screen 11 which is embedded in and coextensive with the sheet packing material 12. The metal strands or wires 13 of the woven screen 11 form a lattice-work within the sheet gasket material. Each pocket or mesh 14 of the lattice confines a portion of the packing material and isolates it from adjacent portions, and thus retains any tear or break within a limited and isolated area of the packing material and precludes the spread of any such tear or break.

The wire screen 11 is preferably coated with a suitable material 15 so that the knuckles 16 which are formed by the overlapping of the strands of the screen (FIG. 1A) are mechanically bonded together. This technique has the advantage that when the gasket material is cut to shape the tendency for the edge strands to fray is obviated.

It is vitally important in a gasket of this type that there be firm adherence between the packing material 12 and the strands of the screen or cloth 11 so that no opportunity for fluid leakage along the surfaces of the wire strands 13 will exist. For this reason, a special adhesive 17 is applied either to the wire cloth or to the inner faces of the packing laminations when the gasket is formed, as will later be described.

One important feature of the invention is the relationship of the wire screen to the amount, disposition and character of the packing material. It will be noted by referring to the enlarged sectional view of FIG. 4A and by referring to FIGS. 3 and 5 that the knuckles 16 of the wire screen extend substantially to the top and to the bottom faces of the completed gasket, although, preferably, there is a finite amount of packing material over the knuckles. This structural arrangement has the advantage that when the gasket is compressed between opposing parts which are to be sealed, the compression load developed by the torque forces applied during the bolting or clamping together of the opposed parts is carried by the knuckles, and the relatively small amount of packing material over the knuckles is compressed and squeezed or cold flowed and packed into the area directly above and beneath the adjacent pockets formed by the screen lattice. In bolting or clamping the opposed parts together, with the gasket of this invention interposed between the parts, spaced pressure points represented by the knuckles of the screen furnish a substantial metal-to-metal columnar contact between the opposed parts to assure tight and firm clamping of the parts. At the same time the packing material inbetween these pressure points is confined by the pockets of the screen so that there is uniform sealing of the opposed parts between these pressure points.

Thus, the solid, essentially non-compressible, non-distortable metal columns insure that the compressible and resilient packing material will be protected (except possible at the knuckles) from compressive forces which might exceed the elastic limits of the packing.

In FIG. 2 the gasket of the invention is shown in position on the block 18 of an engine. Parts of the gasket have been cut away to show the arrangement of the wire core. It is in the areas 20 immediately adjacent the bolt holes 19 that the gasket is subject to the highest compression forces. And it is in these regions that the clamped opposing parts come to rest substantially bottomed on the knuckles of the wire core (see A and B of FIG. 4). At areas 21 somewhat remote from the bolt connections the degree of compression of the gasket material is less than at the bolts and the thickness of the packing material overlying the knuckles of the wire in these areas is greater (see C of FIG. 5) than immediately adjacent the bolts. This fact is shown schematically in the enlarged representation of FIG. 4A and FIG. 5. The dotted lines represent the outer surfaces of the packing material of the gasket before the gasket is installed in a mechanical assembly and show a substantially uniform layer of packing material overlying the knuckles of the wire core. The solid lines above and below the wire core represent the outer surface of the packing material after the gasket has been subjected to compression forces as, for example, upon installation between the head and the block of an engine. Points A and B represent portions of the gasket which are immediately adjacent bolt positions and in these areas the gasket material overlying the knuckles is of a minimum thickness after assembly of the machine. C represents a portion of the gasket which is somewhat remote from a bolt connection and shows that the gasket material overlying the knuckles, while somewhat reduced in thickness as compared with the original gasket material, is still substantially greater than the thickness overlying the knuckles near the points of greatest compression forces.

THE PACKING MATERIAL

The packing material 12 of the gasket may be rubber or some other elastomeric material, or plastics either with or without added fibers, or these materials with cork and with asbestos fiber or with asbestos or cork alone. Other types of fibers which may be used are organic fibers such as wood, cotton, manila, sisal etc. or inorganic fibers such as asbestos and glass. The packing may consist of fibers only.

The cushioning or packing material may be applied to the reinforcing metal layer in the form of previously prepared sheets or alternatively in moist paste form, as will be described. When the packing material is in self-supporting sheet form, the sheets are applied to opposite sides of the metal reinforcing core and the assembly is then subjected to the required pressure to assemble the layers into a single unitary structure.

The sheet packing material may be made of any desired thickness to meet the diverse and varied requirements for the manufacture of gaskets. For special applications, the packing may be fabricated of sheet material in which no binder is used. And, for example, in specific instances, a preferred packing has been asbestos sheet devoid of associated binders.

In a preferred embodiment the packing material used in this invention comprises a fiber material such as asbestos coated and combined with a vulcanizable or curable heat resistant rubber compound, including a curing or vulcanizing agent and an elastomer, which may be natural rubber, but is preferably one of the synthetic rubbers, such as neoprene, butadiene, acrylonitrile, butadiene styrene, or silicone rubber. For many applications, neoprene is preferred. Where the fiber of the packing is asbestos, highly satisfactory sheet material for head gaskets and for manifold gaskets has been prepared using a rubber content of about 10 percent in the packing. In other applications, as for example in compressor head gaskets, a somewhat higher rubber concentration of about 20 percent has been found suitable. The preferred ratio of rubber to fiber in the packing composition will be dictated by the demands of any particular application. For some uses, packing having a binder content of about 3 percent has proven satisfactory, and for other applications the binder concentrations used have reached a value of about 30 percent. For special applications, the binder may be eliminated completely.

While the polymeric material used to coat the fibers and to bond them in the packing material may be either natural rubber or synthetic rubber such as the copolymers of butadiene styrene (GR-S) or butadiene acrylonitrile (GR-N), polychloroprene, etc., for certain applications, various other conventional resinous materials may have particular advantages. Materials of special utility, particularly in high temperature applications, are the polytetrahaloethylenes such as polytetrafluoroethylene known under the trademark "Teflon," and polychlorotrifluoroethylene known under the trademark "Kel-F." These polymeric materials may be selected for their outstanding ability to withstand extremes in service conditions as relates to high temperatures and to high pressures and for their inertness to chemical agents such as glycols, alcohol, oil and gasoline, etc. In still other applications the coating material and binding agent may consist of a thermoplastic resin such as the polymer of copolymers of vinylchloride, vinylacetate, acrylonitrile vinylidene chloride, polyethylene, etc. Thermosetting resins such as phenolic aldehyde resins, modified or otherwise, and urea-aldehyde resins may find special applications.

The remarkable chemical inertness and the high temperature stability of polytetrafluoroethylene and other polytetrahaloethylenes makes these materials particularly useful or suitable for gasket applications. However, an objectionable feature of these polytetrahaloethylenes is that they are subject to cold flow under continuous pressure. This cold flow, which occurs to a considerable degree especially at relatively heavy flange pressures, results in loss of applied torque and in associated leakage. It is a particularly important feature of the present invention that the incorporation of a metal core of the type contemplated and described will minimize the cold flow of the packing material since the vertical walls of the wire mesh will retain the packing and prevent its lateral expression.

In a specific preferred embodiment of the invention the packing material is preferably an asbestos product treated to be temperature, moisture and chemically resistant. The asbestos fibers are individually coated with neoprene and the coated fibers are formed into sheet material. While synthetic elastomeric materials such as neoprene have been found suitable for many applications, for certain special uses where resistance to high temperature is particularly important, a new elastomeric composition consisting of a mercaptan adduct of polybutadiene or other elastomeric materials has been found particularly useful.

Those novel elastomers are adducts prepared by the chemical addition of mercaptans to the unsaturated bonds in diene polymers. The elastomers are derived from the reaction of the double bonds of conventionally prepared diene rubbers with low molecular weight alkyl mercaptans. The reaction is usually carried out in latex form, and the general technology and equipment used in making styrene-butadiene rubber (SBR) and like polymers lend themselves well to the preparation of the aduct derivatives. It has been found that the mercaptan adducts of polybutadiene are more resistant to many oils and fuels of practical interest than is neoprene under similar conditions. Another advantage of the new elastomers is increased high temperature stability of the final polymer. The highly saturated adducts of polybutadiene are outstanding in their ability to retain a considerable portion of their original tensile strength and elongation for extended periods at temperatures as high as 300 degrees F. and for up to three or four hours at temperatures in the range of 500 degrees F. In the range of 500° to 600° F., the adducts readily out-perform both neoprene and butyl rubbers. And the general aging properties of the adducts are superior to neoprene, especially at elevated temperatures.

THE CORE ELEMENT

The metal core or stress-supporting member of the sheet gasket of the invention may be made of steel, copper, aluminum, bronze, stainless steel, other special metallic alloys, etc., having the requisite compressive strength and other properties required in a reinforcing member for use in high pressure and high temperature gaskets. The reinforcing core may be made of light gauge metal, or heavier gauge may be employed for special purposes. Plastic cores or glass fiber cores may find utility for special applications. Steel wire with copper or tin coatings, and galvanized wires have been used successfully.

The cavities or openings in the reinforcing metal member may be of a depth such that the gasket forming material or packing will be retained therein without recourse to auxiliary adhesives. Or, if preferred, relatively shallow cavities may be provided and a suitable adhesive or glue may be applied to the metal or to the gasket material itself before combining the components of the ultimate gasket sheet.

The cavities or the openings in the woven wire mesh are preferably of a size and depth to receive a substantial portion of the gasket forming material or packing when it is compressed in contact with the reinforcing wire. While the gasket material or packing material may be applied to the reinforcing wire screen either in sheet form or as a plastic or in a pulp form, in a preferred embodiment of the invention the packing material is applied as enveloping sheets on either side of the reinforcing metal member.

While steel wire and other steel core material is suitable for most purposes, it will be obvious that for special applications plated metals or copper, aluminum, bronze, Monel, and other metals or metallic alloys uniquely suitable or adapted for the intended purpose can be employed.

For certain applications, a core of expanded metal sheet material affords distinct advantages. The solid transversely extending walls provide a bottoming limit opposing impressed vertical forces applied at the surfaces of the gasket. In addition, the solid walls of metal provide good lateral heat conductivity and also function as barriers to prevent the blowing of the gasket and leakage and seepage of liquids therethrough.

The reinforcing metal core is shown in FIGS. 3 and 4 as embedded between two layers of suitable gasket material, which may be asbestos or felt compositions or any other preferred packing substance. The embedding is accomplished by compressing the two layers toward one another after having inserted the reinforcing element therebetween.

THE CORE KNUCKLE CONSTRUCTION

An important feature of the preferred embodiment of this invention is the knuckle-locking composition 15 (see FIG. 1) which is applied to the woven wire core. The wire is rendered resistant to peeling and fraying in the final product, and the fillets 22 formed at the crossover points impart additional mechanical strength and stability to the metal core. For many applications, the locking composition is preferably a metal such as zinc or tin, etc., applied by dipping the wire in a molten bath of the metal, or by electrolytic deposition, or other suitable techniques. While the unique mechanical strength and compression resistance of metal dictates its use as a knuckle-locking medium for many applications, in other instances as for example where exceptional flexibility of the final sheet material is an important consideration, other types of locking compositions may be preferred. In some embodiments of the invention, plastics and resins find utility as knuckle-locking agents. Particularly suitable compositions include the polytetrahaloethylenes, polyethylenes and polypropylenes etc., vinyl polymers and copolymers, the epoxies, and elastomeric compositions. For some applications, the locking composition may comprise a relatively rigid synthetic such as a very hard epoxy. Where plastics, resins, or other synthetics are preferred, as, for example, because of corrosion resistance, and very high compression forces are involved in the calendering or in the ultimate use of the sheet gasket, the synthetic locking composition should preferably be non-brittle so as to avoid fracture in use. Suitable compositions include the polytetrahalogens, polyethylene and polypropylene, nylon, and compressible or non-brittle epoxies.

THE ADHESIVE COATING

In a preferred embodiment of this invention a waterproof and solvent-resistant adhesive or bonding material 17 is applied to the sheet packing before the sheet material is contacted against the metal core. An adhesive composition which has proven particularly suitable for the purpose is a water dispersion of a curable neoprene and phenolic resin emulsion. Although the above composition is preferred, other adhesives which will withstand the heat and pressure and the action of chemicals and the gases, etc., characteristics of those to which gaskets are normally exposed may be used. The preferred adhesive used will withstand all of the conditions that the gasket packing material itself is required to withstand.

The adhesive coating is applied to that side of the packing sheet which comes into contact with the metal core, and serves as both a bond and as a sealer. In addition, it provides for an improved bond between the packing sheets themselves wherever these meet through the openings of the metal core. The bond of the packing sheet to the metal core and through the metal core to the opposing sheet is improved during the calendering process, during which operation the composite sheet is pressed until the desired uniform thickness and density are attained. These parameters are very important features of the final sheet, especially in high compression engines where the ratio of the combustion space to the displacement of the piston is necessarily a critical value, and where compressive or flange forces are very high.

UTILITY AND SPECIFIC EMBODIMENTS

The packing material thus secured to the reinforcing metal core provides a sheet gasket of substantially uniform thickness throughout and with smooth surfaces. As fabricated for use, the knuckles of the reinforcing metal member will not ordinarily show through the surface of the gasket sheet materials, but a finite thickness of gasket material will cover the knuckles. It has been found that in using the sheet gasket materials of this invention for gaskets subject to high compressive forces, good results are obtained if the quantity or thickness of packing material overlying the knuckles of the reinforcing metal core is such that, upon the application of the sealing or flange pressure, the packing material is compressed so that, in use, only a very thin layer of packing material covers the knuckles of the metal reinforcing member. In fact, it has been observed that exceptional stability and reliability of installations is achieved where the construction of the gasket is such that upon the application of assembly pressure most of the packing material is caused to flow from the knuckle pressure points and the compressing members come to rest or come to bottom essentially on the metal knuckles themselves to provide a substantially solid metal-to-metal contact between the sealing surfaces.

It has been found that because of the tendency of the packing materials to expand somewhat after being pressure sealed to the metal core material, the knuckles of the woven wire may lie in or somewhat below the surface of the sheet gasket thereby providing substantially smooth cushioning surfaces of packing material. The peaks of the knuckles may lie in the surfaces in small pockets or indentations formed by the expansion or rebound of the packing material around the knuckles.

When the gasket is placed under compression, in use, the application of the pressure causes the packing material to compress still further until a condition is reached in which the faces of the sheet seal intimately against the confining surfaces and these surfaces come to rest substantially bottomed on the knuckles of the woven metal core. The knuckles themselves comprise solid piers or pillars which will no distort, bend, or compress under the conditions of gasket installation or use.

In FIG. 3, the sheet gasket product of the invention is shown schematically as positioned between the head and the block of an engine, before tightening the head down against the block. At this stage of installation for use, packing material overlies boh sides of the wire core. As the cylinder head is tightened down on the block (FIG. 4), the surface of the gasket sheet is placed under compression and the packing material is resiliently compressed to effect a tight seal between the contacting surfaces of the confining metal members. As the cylinder head is tightened down on the block still further, the gasket packing is compressed still further until, finally, the block and the head come to rest essentially in metal-to-metal contact with the knuckles of the embedded metal core. Thus, during installation of the gasket the packing material forms the filler or seal between the metal surfaces, conforming to or filling any irregularities in these surfaces; the metal core comprises a non-compressible, non-distortable bottoming or supporting member to resist and to withstand the high torque or flange forces applied in tightening the cylinder head and the block together.

In this structural, integral combination the relatively non-compressible dense portions or the metal piers or pillars of the gasket supply the required force-bearing strength and the wire strands provide blowout resistance, while the less dense, compressible component, that is the packing material 12, with its inherent ability to conform perfectly to the irregularites of the enclosing surfaces, comprises the sealing component. In the final assembly, the yieldable nature of the compressible material creates a substantial internal stress or pressure in the body of the laminated gasket, to the end that the external surfaces of the gasket lie in stressed sealing contact with the confining structural surfaces bearing thereagainst. The non-distortable solid metal supports in the sheet insure that the packing will not be subjected to destructive pressures, either during installation of the gasket or in subsequent use.

The sheet gasket product of the present invention may be further distinguished from and contrasted with the prior art gaskets previously described. For example, in those prior art gaskets which have inner layers of soft fibrous material and outer metallic sheaths, it is usually necessary that the contacting compressing surfaces be lapped or finely machined or ground to insure effective sealing contact with the gasket. There is no such requirement when the gasket of the present invention is used, since, in the preferred embodiment, a finite thickness 23 of compressible and conformable packing material 12 overlies the metal core 11 at the time the gasket is positioned between the mechanical members 24 and 25. During installation and assembly of the mechanical structure, as for example, during tightening of the head bolts 26, the gasket is compressed and the packing material conforms and seals to the confining flanges or surfaces 27 and 28. Simultaneously, the flanges come to rest substantially bottomed on the metal knuckles or pillars 16 of the core of the gasket.

As fabricated, the sheet gasket of the present invention has no metallic elements projecting through the surface of the sheet and the objectionable features associated with such structures are avoided.

The physical relationships of metal core and packing material for the sheet gasket are indicated in Tables 1 through 4 for particular embodiments of the present invention. The examples are presented in order to disclose the invention in full detail, but these examples are not to be considered a limitation of the invention in any way.

Table I

WOVEN WIRE STEEL SCREEN

| Mesh | Wire Diameter (inches) | | Knuckles Thickness (inches) (approx.) | Weight per sq. yd. of Product (lbs.) (approx.) |
|---|---|---|---|---|
| | Warp | Picket | | |
| 16 x 16 (14 x 18) | 0.011 | 0.011 | 0.027 | 1.16 |
| 12 x 12 | 0.007 | 0.0095 | 0.016 | 0.5 |
| 16 x 16 | 0.0095 | 0.0095 | 0.018 | 0.93 |
| 12 x 12 | 0.007 | 0.0095 | 0.019 | 0.5 |

Table II

WEIGHT RELATIONSHIP OF PACKING AND METAL CORE IN SPECIFIC SHEET GASKET PRODUCTS

| Wire Knuckle Thickness (inches) | Wire Weight per sq. yd. of Product (lbs.) | Packing Weight per sq. yd. of Product (lbs.) | Total Weight per sq. yd. of Product (lbs.) |
|---|---|---|---|
| 0.027 | 1.16 | 2.0 | 3.16 |
| 0.027 | 1.16 | 2.4 | 3.56 |
| 0.016 | 0.5 | 1.05 | 1.55 |
| 0.017 | 0.5 | 1.4 | 1.9 |
| 0.018 | 0.93 | 1.6 | 2.53 |
| | | 2.4 | 2.4 |

Table III

CALENDERED SHEET GASKET

| Knuckle Thickness (inches) | Overall Sheet Thickness (inches) | Packing Weight per sq. yd. of product (lbs.) | Percent Metal (by volume) | Packing Density (grams/cc.) |
|---|---|---|---|---|
| 0.027 | 0.031 | 2.0 | 10.0 | 1.54 |
| 0.027 | 0.036 | 2.4 | 8.75 | 1.61 |
| 0.016 | 0.019 | 1.05 | 7.2 | 1.28 |
| 0.017 | 0.022 | 1.4 | 6.2 | 1.46 |
| 0.018 | 0.025 | 1.6 | 10.0 | 1.53 |
| 0.019 | 0.027 | 1.6 | 9.2 | 1.4 |
| | 0.031 | 2.4 | | 1.06 |

Table IV

BOTTOMED GASKET

| Knuckle Thickness (inches) | Overall Sheet Thickness (inches) | Packing Weight per sq. yd. of product (lbs.) | Percent Metal (by volume) | Packing Density (grams/cc.) |
|---|---|---|---|---|
| 0.027 | 0.027 | 2.0 | 11.6 | 1.78 |
| 0.027 | 0.030 | 2.4 | 10.4 | 1.92 |
| 0.016 | 0.016 | 1.05 | 8.5 | 1.54 |
| 0.017 | 0.017 | 1.4 | 7.9 | 2.0 |
| 0.018 | 0.022 | 1.6 | 11.3 | 1.74 |
| 0.019 | 0.024 | 1.6 | 10.4 | 1.6 |

In most of the examples shown the thickness of the wire in the warp direction has been indicated to be the same as that in the picket direction. However, this is not a requirement and it is possible to use a given thickness or gauge of wire in one direction and a different thickness of wire in the other direction. For example, in the preparation of thin packing sheet material such as sheet material having an overall thickness of about 0.022", a good product has been obtained using 0.0095" diameter wire in one direction and 0.007" wire in the other direction. Again, the mesh of a screen is not critical although 14 x 14 mesh or 16 x 16 mesh has been found highly satisfactory. The combination of 0.0095" and 0.007" wire has also been used in fabricating a sheet gasket material having an ultimate calendered thickness of from about 0.018" to about 0.021". Wire mesh of 12 x 12, 14 x 14, 16 x 16, 18 x 18, and unsymmetrical lattice meshes have also been used successfully.

For thin sheet material, in the order of 0.003" to 0.008", the reinforcing wire is ordinarily 0.001" to 0.003" in diameter. In general, the finer the wire in the woven wire reinforcing core, the finer may be the mesh employed, and for wire thicknesses in the range of 0.001" meshes of 40 to 80 have been used successfully. For somewhat thicker sheet gasket material in the range of 0.010" to about 0.018", the wire is preferably 0.006" to about 0.010" diameter and the screen mesh is in the range of 11 to 20. For sheet gasket material having a thickness in the range of about 0.040" to about 0.060", the wire is preferably in the range of about 0.018" to about 0.025" in diameter and the screen mesh is in the range of about 6 to about 10. In the intermediate, and more common gasket thickness range, as for example in the range 0.020″ to about 0.035″, the wire diameter is preferably in the range of 0.010″ to about 0.018″ and the mesh is preferably about 12 to about 18.

The woven metal core material which finds utility in the present invention includes screens in which both the thickness of the wire and the size of the mesh may vary over a considerable range. The particular woven wire to be used will depend to a large extent on the type of gasket, its intended ultimate use, and specific engineering specifications. For sheet packing material having a final nominal thickness of $\frac{1}{32}$ of an inch or 0.031″, the wire reinforcing core is preferably in the order of about 14 x 18 mesh or about 16 x 16 mesh and the wire thickness is preferably about 0.011″ in both the warp and the picket directions. For thinner sheet packing material, as for example sheet packing having a nominal thickness of about 0.025″, the wire thickness is preferably somewhat less than in the case of the thicker sheet material and wire thicknesses of 0.0095″ in both the warp and the picket directions have been found suitable. As the wire thickness is reduced, it is generally feasible and desirable to increase the mesh of the wire, and for the 0.025″ gasket material wire mesh of about 16 x 16 or 18 x 18 has been found suitable.

For applications involving higher ultimate flange pressures, for a given thickness of wire core, the total quantity of packing composition per unit area should be increased and the calendered thickness of the sheet will be somewhat greater than the values suggested above. For example, the 0.031″ sheet gasket might be increased in thickness to about 0.033″ or 0.034″, and the 0.025″ product to about 0.027″. The quantity of packing to be used in any given case will be such that when the gasket is installed and the required flange pressure is applied, the flanges will come to rest separated from each other by a distance only slightly greater than the thickness of the wire core as measured at the knuckles. That is, ordinarily the distance between flanges will be within several thousandths of the overall knuckle thickness and usually within about 0.002″ to about 0.004″. In some instances, the values may more closely approximate the maximum thickness of the metal core. In still other cases, the values may measure the same. Typical values of preferred embodiments of the sheet gasket of the invention are shown in Tables 1 through 4 in which the woven metal core dimensions are recorded together with such data as the weight and volume ratios of packing material to metal, the density of the packing in both the calendered and in the "bottomed" products, and the thickness of both calendered sheet and bottomed gaskets. The metal core of Tables 1 through 4 is woven steel wire and the packing material is latex coated asbestos fiber. Other types of core material and packing may be used, and for these the densities and other physical constants will necessarily differ, but in all instances the fundamental concepts of the present invention will control and dictate the nature of the reinforcing core, and the nature and the amount of the packing material associated therewith.

The quantity of packing material to be used with any particular wire or metal core, and the overall thickness of the calendered composite sheet product will depend upon several factors. As has been pointed out above and as indicated in the tables, the thickness of the sheet gasket product will depend upon the ultimate use and will vary even for a given packing composition and a given metal core. In addition, the composition and the physical properties, such as density and compressibility, etc., of the particular packing will themselves affect the final practical thickness of any given sheet product. Thus, while the principles and parameters of the present invention have been explained and defined with reference to a particular preferred packing composition, it is readily evident that the pertinent variables must be reconsidered and reevaluated in adapting the invention to other packing compositions. The fundamental consideration is that, in the final assembled mechanical device, the gasket used must be so formulated and fabricated that the flanges of the mechanical structure will come to rest essentially bottomed on the metal core of the sheet gasket, while, at the same time, the packing material will itself have become compressed to a degree such that while still retaining its resilient characteristics, it has become sufficiently dense and compact to be impervious to the liquids and gases to which it is exposed in use. The packing must also have been compressed to a degree sufficient to insure effective sealing contact with the confining surfaces of the mechanical assembly.

In a typical mechanical assembly of the type in which a gasket is used to provide a seal between two metal members, the compressive forces imposed during installation are somewhat greater in the region of the bolts or other clamping or holding elements than at points linearly displaced from the bolts, etc. (FIGS. 2, 4 and 5). As a result, some distortion of the planar contacting surface (e.g., of the engine head) may occur during assembly of the particular mechanical structure. Under these conditions, the resiliency and compressibility of the packing must be sufficient to effect positive sealing both near the bolts and at areas away from the bolts. And during operation of the engine or pump, or compressor etc., temperature fluctuations and gradations and the very high pressures developed in the device impose forces tending to cause the sealing surfaces to move toward and away from each other at significant frequencies and through appreciable amplitudes in response to the driving forces developed. These dynamic stresses vary as a function of the distance from points of clamping or applied sealing forces and impose stringent and exacting sealing demands in both the limited area immediately adjacent the clamping elements and in the more extensive surface areas removed therefrom.

In accordance with the practice of this invention, at points adjacent the bolts or other clamping elements, the gasket of the invention provides a substantially solid metal column constituting an essentially non-compressible, non-resilient metal-to-metal contact between opposed clamped surfaces. And in areas removed from the immediate location of the bolts or clamps, that is in the areas where the opposed surfaces undergo maximum transverse linear displacement and vacillation, the sheet gasket of the invention provides a compressible, resilient packing seal reinforced and protected by an internal woven metal core. The metal core provides, throughout the entire area of the sealing gasket, a mechanical element which not only strengthens the gasket, but also insures that the elastic limits of compressibility of the packing material are not exceeded either during installation of the gasket or in subsequent operation of the equipment in which it is incorporated.

METHODS OF MAKING THE GASKET PRODUCTS

A preferred method of manufacturing the sheet gasket product of this invention will be described with reference to FIG. 6 in which the necessary equipment and the general mode of operation are indicated schematically. The wire cloth core material 31 is shown on a supply roll 32 at the left of the schematic diagram. Two supply rolls 33 and 34 carry uncalendered sheet packing 35. The other equipment includes a tank 36 containing a knuckle-locking composition 37, a drying or curing oven 38, which may or may not be necessary depending upon the nature of the locking composition, tanks 39 and 40 containing an adhesive material 41 and having associated therewith applicators 42 and 43 for applying the adhesive 41 to the sheet packing 35. Other parts of the apparatus include calendering roller assemblies 44 and 45. Also shown on the diagram are guide rollers the functions of which are readily apparent. At the extreme right of the drawing is a motor-driven cylinder 46 or roller on which the calendered composite product 47 is collected.

The wire core material 31 is first cleaned in the usual manner. It is then passed over guide roller 48 and into the locking composition 37 in tank 36. A guide roller 49 positioned in the tank 36 below the level of the locking composition 37 insures proper submersion of the wire. As the wire emerges from the tank 36 it drains into the tank and passes between rollers 50 and 51 which remove excess locking material from the metal. While the locking compositions may be plastics, resins, or metals, where the final products are to be subjected to high calendering pressures or are intended for high flange pressure applications, the knuckles of the woven wire core are locked preferably with metal such as zinc or tin etc., or with a non-brittle synthetic composition. The coated wire passes over guide roller 52 and, depending upon whether the coating material or locking material is a metal or is a self-curing composition or whether it is, alternatively, a plastic or resin requiring curing, the coated wire is passed through an oven 38. While the application of the locking composition to the knuckles of the wire has been found to yield greatly superior products and is a preferred procedure for less demanding applications this step may be omitted.

In this continuous process, the sheet packing material is applied simultaneously to each side of the wire core. The sheet packing is pulled from supply roller 33 under guide roller 53 and over the adhesive applying roller 42 of adhesive tank 39. The adhesive is thus applied to the bottom surface of the sheet packing. The coated sheet packing passes through the assembly guided by roller 54 until it reaches the calendering assembly 44. At the same time the packing material 35 is pulled from supply roller 34 and, guided by roller 56, contacts adhesive applying roller 43 of tank 40, whereby adhesive composition 41 is applied to the surface of the sheet packing. The coated sheet passes over guide rollers 57 and 58 until it reaches the calendering assembly 44.

The wire core, flanked on each side by sheets of adhesive coated packing, passes between guide rollers 54 and 58 to the calendering assembly 44 at which point pressure or heat and pressure are applied and the packing layers of the metal core are made into a single integral product. The product may be subjected to treatment in a second calendering assembly 45, and finally the finished product is collected on the driven cylinder 46.

The locking of the knuckles or crossover points of the wire improves the final product in that peeling at the periphery of the gasket is obviated. The adhesive composition applied to the sheet packing is preferably a curable neoprene-phenolic resin in the form of a water dispersion or emulsion but other suitable compositions may be substituted. In accordance with the preferred practice of the invention, the adhesive coated sheets are combined with the internal metallic core while the adhesive is partly cured or cured but still tacky.

While a wire reinforced sheet packing material may be prepared without using an adhesive on the sheets themselves, it has been found that highly improved results and greatly superior products are obtained when such an adhesive is used. And for some applications, the use of adhesive between the sheets is absolutely essential.

For some less demanding applications the following simplified and abbreviated process may be used. The wire is coated with an adhesive and the film partially dried. The coated wire is then inserted between sheets of previously prepared packing material and the composite assembly is calendered and cured. The quality and the usefulness of the final composite product are improved if, before inserting the wire core, the packing sheets are also coated with an adhesive composition so that when pressed against the metal insert the packing sheets will bond not only to the metal but also to each other through the mesh of the metal reinforcing member.

As alternative methods, the metal-reinforced sheet packing of the invention may be made in conjunction with the normal operation of a cylinder-type wet lap paper board machine. A pre-cut length of wire cloth is inserted between the pick-up roll and the wet lap after a sufficient wet lap has been built up on the roll. The deposition of packing material is then continued until a sufficient quantity of wet lap has been built up on the opposite side of the wire cloth or screen. The composite sheet, containing the wire cloth insert, is cut off the pick-up roll, dried, and calendered. It has been found that in gasket sheet products prepared in accordance with this procedure, the fibers of the packing composition mesh through the openings in the metal screen to give an integral final composite sheet. It is possible to use a multiple cylinder paper machine and to insert the wire cloth, from a web, between plies formed by the multi cylinders.

Still another method of preparing the sheet gasket product of the invention is to run off a wet lap of packing sheet onto a table. The sheet is then covered with a wire cloth. A top layer of wet lap is added, and the "sandwich" is processed as previously described.

In the light of the above disclosure, many other procedures by which the new gaskets of the invention may be fabricated will suggest themselves to those skilled in the relevant art.

While disclosures of preferred embodiments of the products and of preferred methods for fabricating the products of the invention have been provided, it will be apparent that numerous modifications and variations thereof may be made without departing from underlying principles of the invention. It is therefore desired by the following claims to include within the scope of the invention all such variations and modifications by which substantially the results of this invention may be obtained through the use of substantially the same or equivalent means.

What is claimed is:

1. In a gasket, a calendered sheet of compressible and normally resilient sheet packing material having a predetermined thickness and adapted throughout a predetermined allowable range of compression to retain its normal resiliency, and a woven metal wire screen embedded substantially centrally in said sheet packing material and spaced from opposite faces of the sheet packing material, said wire screen having knuckles of predetermined thickness equal to at least one-half of said predetermined thickness of said sheet for limiting compression of the sheet packing material to said allowable range, and said wire screen constituting a relatively small percentage of the volume of said calendered sheet so that said sheet is made up primarily from compressible packing material.

2. In a gasket, a calendered sheet of compressible and normally resilient sheet packing material having a predetermined thickness and adapted throughout a predetermined allowable range of compression to retain its normal resiliency, and a woven metal wire screen embedded substantially centrally in said sheet packing material and spaced from opposite faces of the sheet packing material and constituting not substantially more than about ten percent of the volume of said calendered sheet so that said sheet is made up primarily from compressible packing material, and said wire screen having knuckles of a predetermined thickness equal to at least one-half of the thickness of said calendered sheet for limiting compression of the sheet packing material to said allowable range.

3. In a gasket, a calendered sheet of compressible and normally resilient sheet packing material having a predetermined thickness and adapted throughout a predetermined allowable range of compression to retain its normal resiliency, and a woven metal wire screen embedded substantially centrally in said sheet packing material and spaced from opposite faces of the sheet packing material and having a mesh and wire size such that said wire screen constitutes a relatively small percentage of the volume of said calendered sheet so that said sheet is made up primarily from compressible packing material, and said wire screen having knuckles of a thickness equal to about 70% to 90% of the thickness of said sheet for limiting compression of the sheet packing material to said allowable range.

4. A gasket as set forth in claim 3 in which the volume of the wire screen in relation to the volume of the calendered sheet is not more that about ten percent.

References Cited in the file of this patent

UNITED STATES PATENTS

| | | |
|---|---|---|
| 244,557 | Crawford | July 19, 1881 |
| 311,707 | Adams et al. | Feb. 3, 1885 |
| 1,370,234 | Stewart | Mar. 1, 1921 |
| 1,911,484 | Victor | May 30, 1933 |
| 1,919,967 | Thompson | July 25, 1933 |
| 2,304,263 | Luty | Dec. 8, 1942 |
| 2,545,370 | Mittelmann | Mar. 13, 1951 |
| 2,956,723 | Tritsch | Oct. 18, 1960 |